(12) United States Patent
Aramaki (10) Patent No.: US 7,225,922 B2
(45) Date of Patent: *Jun. 5, 2007

(54) CASE

(75) Inventor: Satoshi Aramaki, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 410 days.

This patent is subject to a terminal disclaimer.

(21) Appl. No.: 10/799,882

(22) Filed: Mar. 15, 2004

(65) Prior Publication Data

US 2004/0173478 A1 Sep. 9, 2004

Related U.S. Application Data

(63) Continuation-in-part of application No. 10/030,315, filed as application No. PCT/JP00/04710 on Jul. 13, 2000, now Pat. No. 6,837,372.

(30) Foreign Application Priority Data

Jul. 16, 1999 (JP) .............................. P. 11-203279

(51) Int. Cl.
 *B65D 85/57* (2006.01)
(52) U.S. Cl. .................. 206/308.3; 220/4.22; 220/315; 220/784; 220/799
(58) Field of Classification Search ............... 220/4.22, 220/4.23, 315, 323, 780, 784, 796, 799; 206/308.3; 215/43, 321
 See application file for complete search history.

(56) References Cited

U.S. PATENT DOCUMENTS 4,886,204 A 12/1989 Kalmanides

| 5,373,944 | A | 12/1994 | Ishituka |
| 5,752,615 | A | 5/1998 | Hofmann et al. |
| 5,755,323 | A | 5/1998 | Zahn et al. |

FOREIGN PATENT DOCUMENTS

| JP | 57-174320 | 11/1982 |
| JP | 61-141283 | 9/1986 |
| JP | 62-260664 | 11/1987 |
| JP | 63-137748 | 9/1988 |
| JP | 64-11964 | 1/1989 |
| JP | 2-31886 | 2/1990 |
| JP | 5-16653 | 3/1993 |
| JP | 7-21515 | 4/1995 |
| JP | 09-272583 A | 10/1997 |

OTHER PUBLICATIONS

Microfilm of the specification and drawings annexed to the request of Japanese Utility Model Application No. 064098/1981 (Laid-open No. 174320/1982) (Hiroshi Yamaguchi), Nov. 4, 1982, p. 3, lines 3 to 5.

*Primary Examiner*—David T. Fidei
(74) *Attorney, Agent, or Firm*—Sughrue Mion, PLLC (57) ABSTRACT

The invention relates to a case (10) for disk cartridges comprising a containing part (1) adapted to contain the disk cartridges (D), and a lid part (2) which is provided on an opening (1*a*) of the containing part (1) via a hinge part (3) and adapted to be freely opened and closed. There are provided at least one pair of locking portions (6*a*), (6*b*) which are adapted to be engaged with each other in areas near corners (c) of both side faces of the opening (1*a*) of the containing part (1) and an opening (2*a*) of the lid part (2). Therefore, the invention has made it possible to provide the case which can be simply manufactured and can obtain sufficient lock holding force required for practical use.

19 Claims, 10 Drawing Sheets

RELATED ART

FIG. 3 (R)

RELATED ART

CASE

This is a Continuation-In-Part of application Ser. No. 10/030,315 filed Jan. 10, 2002, now Pat. No. 6,837,372 which is a 371 of PCT/JP00/04710 filed Jul. 13, 2000; the disclosures of which are incorporated herein by reference.

FIELD OF THE INVENTION

The present invention relates to a case, particularly to a case for recording medium, and more particularly to a case for disk cartridges for containing the disk cartridges such as MD, FD, MO, and so on.

DESCRIPTION OF THE RELATED ART

Figure 4:
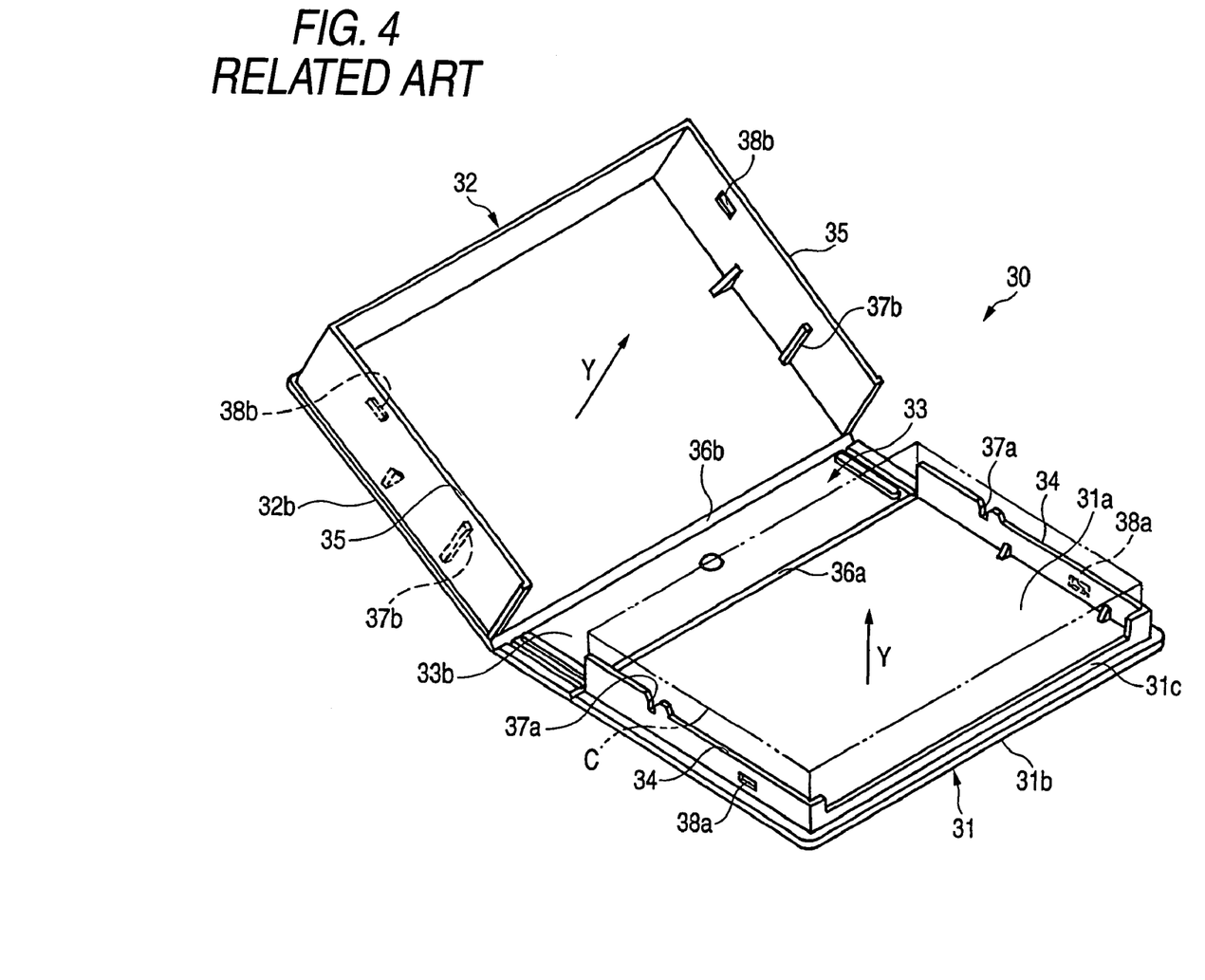
FIG. 4 is a perspective view of a case for a magnetic tape cassette in a conventional example in a state where a lid part is open.

There has been conventionally known a case for a magnetic tape cassette as shown in FIG. 4, which contains the magnetic tape cassette.

This case 30 for the magnetic tape cassette includes a containing part 31 adapted to contain a magnetic tape cassette C, and a lid part 32 which is provided on the containing part 31 via a hinge part 33.

The containing part 31 is provided with an extended portion 31c and side walls 34 on three sides which surround a flat plate area 31b and are not in contact with the hinge part 33. The lid part 32 is provided with side walls 35 on three sides which surround a flat plate area 32b and are not in contact with the hinge part 33. The containing part 31 and the lid part 32 are connected by means of the hinge part 33 which has thin walled grooves 36a, 36b on both sides of a flat plate area 33b thereof.

An opening 31a of the containing part 31 is covered with the lid part 32 which is adapted to be freely opened and closed, and thus, the magnetic tape cassettes C which has been contained in the containing part 31 can be stored.

Meanwhile, the containing part 31 of this case 30 for the magnetic tape cassette has V-shaped engaging recesses 37a formed in middle areas of both the left and right side walls 34 adjacent to their base sides, and locking portions 38a in a shape of groove formed in the middle areas of both the left and right side walls 34 adjacent to their front sides.

On the other hand, the lid part 32 has rod-like engaging projections 37b at inner faces in middle areas of both the left and right side walls 35 adjacent to their base sides, and locking portions 38b in a shape of projection formed on outer faces in the middle areas of both the left and right side walls 35 adjacent to their front sides.

And, the lid part 32 has been closed, the engaging recesses 37a are engaged with the engaging projections 37b, while the locking portions 38a are engaged with the locking portions 38b so as to lock the lid part 32.

Lock holding force of the lid part 32 can be made sufficient through the engagement between the engaging recesses 37a and the engaging projections 37b, and the engagement between the locking portions 38a and the locking portions 38b.

However, in order to obtain sufficient lock holding force of the lid part 32, a locking mechanism must be of such a structure as making undercuts inevitably. In other words, the depressions and the projections of the locking portions 38a, 38b must be in such shapes that they cannot be released in a direction Y in which molds are opened.

As the results, there has been a problem that on occasion of molding, sliding cores which are adapted to move in different directions from the direction Y in which the molds are opened must be employed, and manufacturing process will be complicated.

Figure 5:
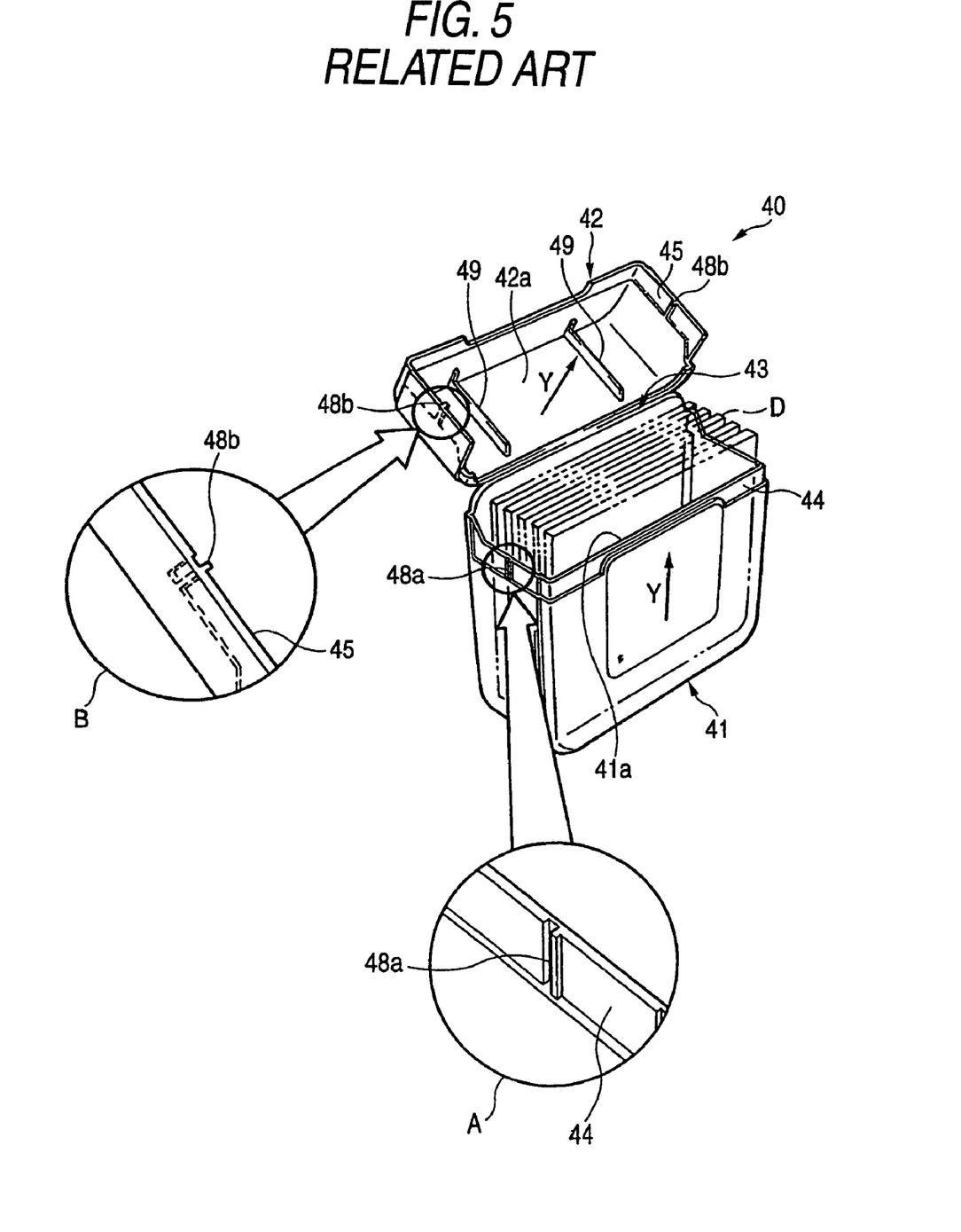
FIG. 5 is a perspective view of the case for disk cartridges in the conventional example in a state where a lid part is open.

Therefore, in order to solve such a problem, there has been proposed a case for disk cartridges as shown in FIG. 5.

This case 40 for disk cartridges includes a containing part 41 adapted to contain a plurality of disk cartridges D, and a lid part 42 provided on an opening 41a of the containing part 41 via a hinge part 43.

The containing part 41 is composed of a deep container, and provided with an outer stepped portion 44 having a thin wall thickness at an open edge of the opening 41a. On the other hand, the lid part 42 is provided with an inner stepped portion 45 having a thin wall thickness at an open edge of the opening 42a so that the outer stepped portion 44 of the containing part 41 and the inner stepped portion 45 of the lid part 42 may be engaged with each other.

There are also provided, in substantially middle areas of both side faces of the outer stepped portion 44, locking portions 48a (shown in an enlarged view A of an essential part) having a shape of depression and projection along a direction of a vertical axis (same as the direction Y in which the molds are opened). Meanwhile, there are provided, in substantially-middle areas of both inner side faces of the inner stepped portion 45, locking portions 48b (shown in an enlarged view B of an essential part) having a shape of depression and projection along the direction of the vertical axis (also the same as the direction Y in which the molds are opened).

When the lid part 42 has been closed, the locking portions 48a of the containing part 41 are engaged with the locking portions 48b of the lid part 42 so as to lock the lid part 42. There are further formed, at an inner face of a ceiling of the lid part 42, projecting ribs 49 which project in a back and forth direction of the lid part at left and right sides of its central area, to increase mechanical strength of the lid part 42.

In the case 40 for disk cartridges having such a structure, all of the locking portions 48a, 48b of the lock mechanism have the shape of depression and projection along the direction of the vertical axis. This means that they have the shape of depression and projection which is open in the direction Y in which the molds are opened. Accordingly, it has become possible to mold the case without employing the sliding cores which are adapted to move on occasion of molding, and the production will become easy.

However, since the locking portions 48a, 48b of this lock mechanism are provided in the substantially middle areas of both the side faces of the openings 41a; 42a, and in the stepped portions 44, 45 of the open edges which have thin wall thickness, they are easily flexed, and because of the flexure, the lock tends to be disengaged. In addition, in the engagement between the locking portions 48a and the locking portions 48b, the depressions and the projections of both the locking portions tend to be engaged in their end areas only.

For this reason, it has been impossible for the lock mechanism of the lid part 42 to obtain sufficient lock holding force required for practical use.

The invention has been made in view of the above described circumstances, and it is an object of the invention to provide a case which can be simply manufactured, and can obtain sufficient lock holding force required for practical use.

DISCLOSURE OF THE INVENTION

In order to attain the above described object, the case according to the invention includes a containing part adapted to contain objects to be contained, and a lid part which is provided on an opening of the containing part via a hinge part and adapted to be freely opened and closed, and the case is characterized in that in areas near corners of both side faces of the opening of the containing part and an opening of the lid part, there are provided at least one locking portions which are respectively adapted to be engaged with each other.

Herein, the area near the corner means a range within one fourth of a width of each of the side faces of the case, and in case of a case for MD as shown in an embodiment as described below, specifically means a range of 0 mm to 7 mm from the corner. The range of the area may be appropriately modified according to requisites such as material of the case, shapes of the locking portions, and in case of other embodiments besides the case for MD, the range may be appropriately modified.

The locking portions may be composed of a shape of depression and projection and a shape of projection and depression which are adapted to be engaged with each other. Alternatively, the locking portions may be composed of a depression and a projection which are adapted to be engaged with each other, or a projection and a depression which are adapted to be engaged with each other.

The locking portions may be provided in the areas near the corners at a front side, and in addition, in substantially middle areas of both the side faces of the openings of the containing part and the lid part, or in areas near corners at a back side.

In this case, the locking portions for locking the lid part are provided in the areas near the corners of both the openings of the containing part and the lid part, that is to say, in the places which are hard to be deformed and strong in strength. For this reason, the lock is not likely to be disengaged, and the necessary lock holding force required for practical use can be sufficiently obtained.

Further, because the sufficient lock holding force can be obtained, the lock mechanism need not be made in an undercut shape, and the production will be simplified, without employing the sliding cores.

BEST MODE FOR CARRYING OUT THE INVENTION

The invention aims to solve the above described problems.

Now, one embodiment according to the invention will be described in further detail referring to the drawings. The same structure as the conventional case for disk cartridges as shown in FIG. 5 will be described in a simplified manner.

Figure 1:
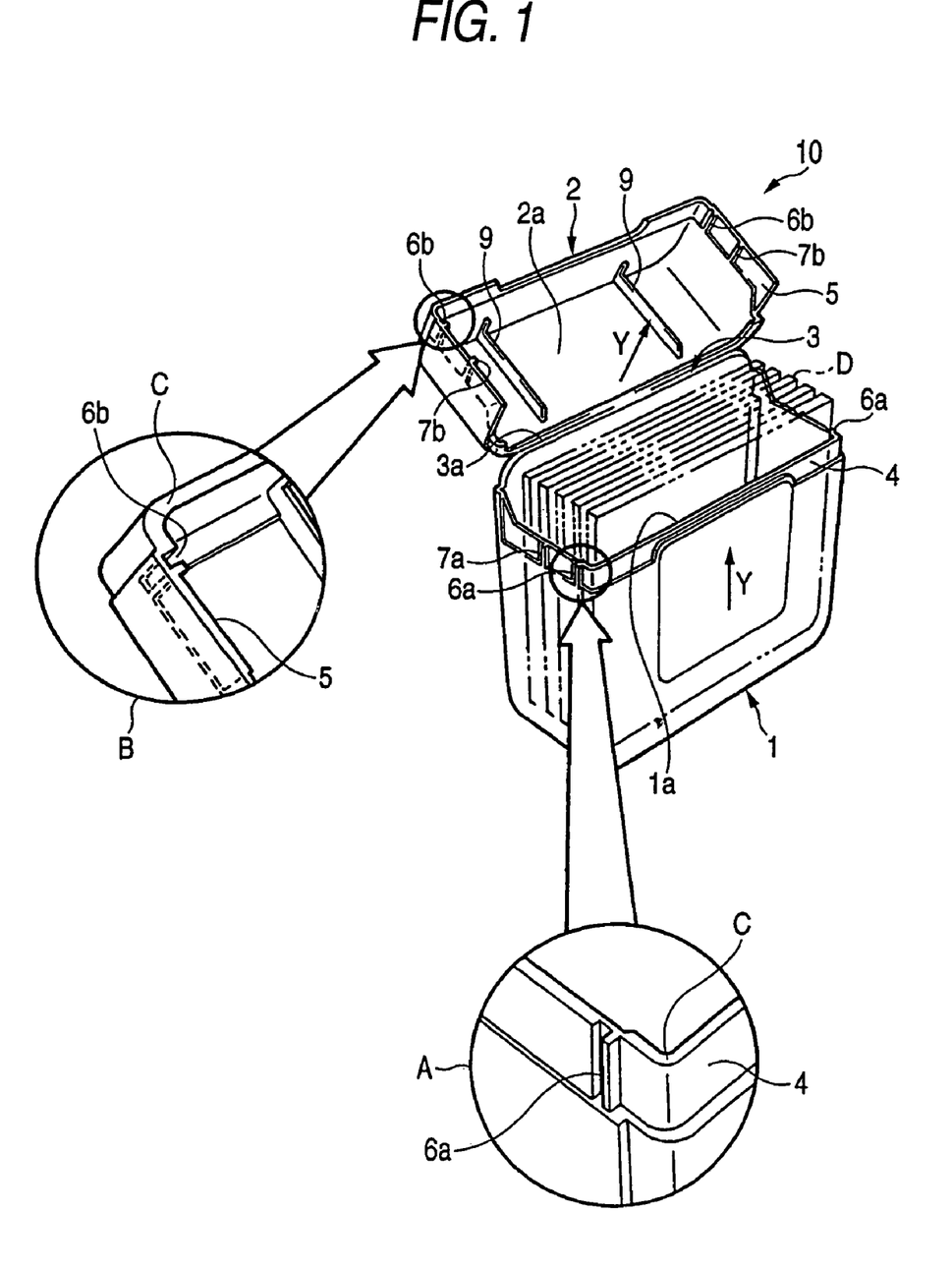
FIG. 1 is a perspective view of a case for disk cartridges in one embodiment according to the invention in a state where a lid part is open.

FIG. 1 is a perspective view of the case for disk cartridges of the one embodiment according to the invention in a state where a lid part is open.

A case 10 for disk cartridges in this embodiment includes as main components similarly to the conventional case, a containing part 1 adapted to contain disk cartridges D as objects to be contained, and a lid part 2 which is provided on the containing part 1 via a hinge part 3.

The containing part 1 is composed of a deep container, and can contain five mini disks (MD) D. The lid part 2 composed of a shallow lid is connected to an opening 1a of the containing part 1 by means of the hinge part 3 having a thin walled groove 3a.

The containing part 1 is provided with an outer stepped portion 4 having a thin wall thickness at an open edge of the opening 1a. On the other hand, the lid part 2 is provided with an inner stepped portion 5 having a thin wall thickness at an open edge of the opening 2a so that the outer stepped portion 4 of the containing part 1 and the inner stepped portion 5 of the lid part 2 are engaged with each other when the lid part 2 is closed.

In areas near both corners c at front sides of the outer stepped portion 4, there are provided locking portions 6a having a shape of depression and projection along a direction of a vertical axis (same as a direction Y in which the molds are opened) as shown in an enlarged view A of an essential part of FIG. 1. On the other hand, in areas near both corners c at front sides of the outer stepped portion 5, there are provided locking portions 6b having a shape of depression and projection along the direction of the vertical axis (the direction Y) as shown in an enlarged view B of an essential part of FIG. 1.

In substantially middle areas of both the side faces of the outer stepped portion 4, there are provided locking portions 7a having a shape of depression and projection also along the direction of the vertical axis, and in substantially middle areas of both inner side faces of the inner stepped portion 5, there are provided locking portions 7b having a shape of depression and projection also along the direction of the vertical axis.

Ridgelines of these locking portions 6a, 6b and the locking portions 7a, 7b having the shape of depression and projection are rounded at a radius of about 0.1 mm to 0.2 mm.

When the lid part has been closed, the locking portion 6b is engaged with the locking portion 6a, and at the same time, the locking portion 7b is engaged with the locking portion 7a so as to lock the lid part 2.

Moreover, on an inner face of a ceiling of the lid part 2, there are formed projecting ribs 9 in order to increase mechanical strength of the lid part 2.

Then, operation of the case for disk cartridges in this embodiment will be described.

In this case 10 for disk cartridges, since a pair of the locking portions 6a, 6b are provided in the areas near the corners c of both the openings 1a, 2a of the containing part 1 and the lid part 2, the locking portions 6a, 6b are located in the areas which are hard to be deformed. In short, they are provided at such places as being hardly flexible and strong in strength. Accordingly, the lock is not likely to be disengaged, and sufficient lock holding force of the lid part 2 as required for practical use can be obtained.

Because the sufficient lock holding force can be obtained, there will be no need of making the lock mechanism of the lid part 2 in an undercut shape, and the production will be simplified. In other words, the lock mechanism of the lid part 2 has a shape of being undercut free to be opened in a direction in which the molds are opened on occasion of integral injection molding of the case for disk cartridges, and thus, the production will be simplified.

By providing a pair of the locking portions 7a, 7b in the substantially middle areas of both the side faces of the openings 1a, 2a in parallel to the locking portions 6a, 6b, the lock holding force will be more or less strengthened. However, the provision of the pair of the locking portions 7a, 7b is not necessarily required, because only a pair of the locking portions 6a, 6b are sufficient. Although these locking portions 7a, 7b are not necessarily required for the lock, they act as positioning guides for the lid part 2 when the lid part 2 is closed, and serve to enable the locking portions 6a, 6b to be engaged accurately.

Further, the ridgelines of the locking portions 6a, 6b and the locking portions 7a, 7b having the shape of depression and projection are rounded. Therefore, since the locking portions 6a, 6b and the locking portions 7a, 7b having the shape of depression and projection are not square-cornered, the holding force of the lid part 2 will not be abruptly deteriorated because of abrasion of the locking portions. Still further, provided that the locking portions 6a, 6b and the locking portions 7a, 7b have been rounded from the beginning, their action as the positioning guides will be enhanced, thus ensuring smooth opening and closing operation of the lid part 2.

Although only one embodiment of the invention has been described above, the invention is not limited to the above described embodiment, but can be modified and improved appropriately. For example, this case is not only applied to the case for disk cartridges but can be applied to cases for various objects to be contained. Although in this embodiment, one pair of the locking portions are provided in the areas near the corner of the openings, and the other pair of the locking portions are provided in the substantially middle areas of both the side faces of the openings, the one pair of the locking portions may be provided only in the areas near the corners of the openings.

Furthermore, the pair of the locking portions are composed of the shape of depression and projection and the shape of projection and depression to be engaged with each other in this embodiment. However, they may be composed of a depression and a projection to be engaged with each other, or a projection and a depression to be engaged with each other.

EXAMPLE

Now, a specific example of the case for disk cartridges according to the invention will be described to clarify effects of the invention.

Figure 2:
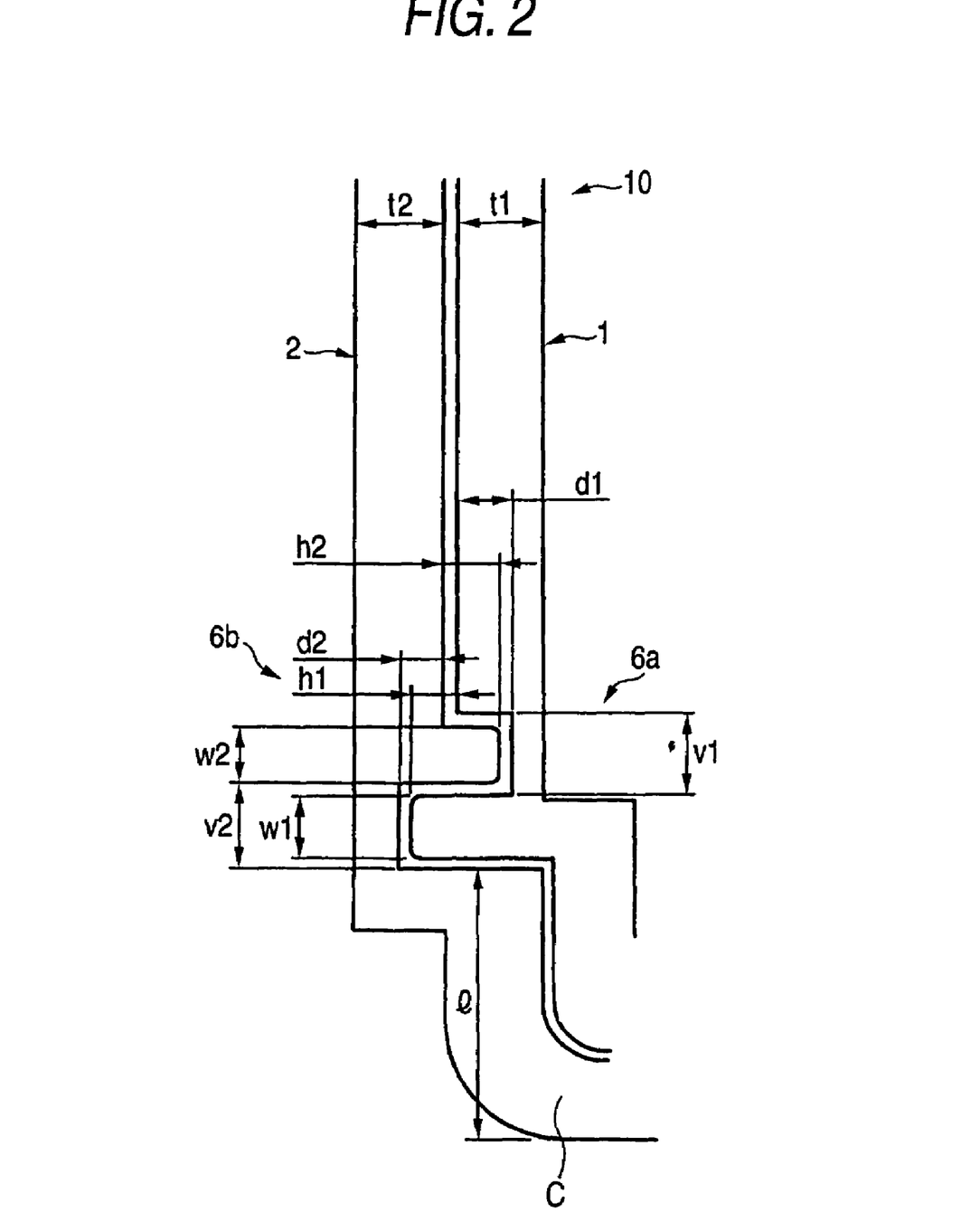
FIG. 2 is an enlarged sectional view of locking portions of the case for disk cartridges in this embodiment.

FIG. 2 is an enlarged sectional view showing a pair of the locking portions which are provided in the areas near the corners of the case. The case 10 for disk cartridges has been integrally molded by injection molding, employing resin of PP (polypropylene) as material.

Specific values of sizes of the locking portions 6a, 6b of the containing part 1 are as follows.

The positions where the locking portions 6a, 6b of the containing part 1 are provided are the areas near the corners c, and at 3.8 mm apart from a front face of the case toward a back face of the case.

The locking portion 6a of the containing part 1 has a standard thickness t1=0.68, a width of the depression v1=1.00, a depth of the depression d1=0.45, a width of the projection w1=0.60, and a height of the projection h1=0.45. Meanwhile, the locking portion 6b of the lid part 2 has a standard thickness t2=0.76, a width of the projection w2=0.60, a height of the projection h2=0.40, a width of the depression v2=1.00, and a depth of the depression d2=0.45. The values are in millimeters (mm).

The ridgelines of the depression and the projection of the locking portions 6a, 6b are rounded at a radius of about 0.1 mm to 0.2 mm.

Figure 3:
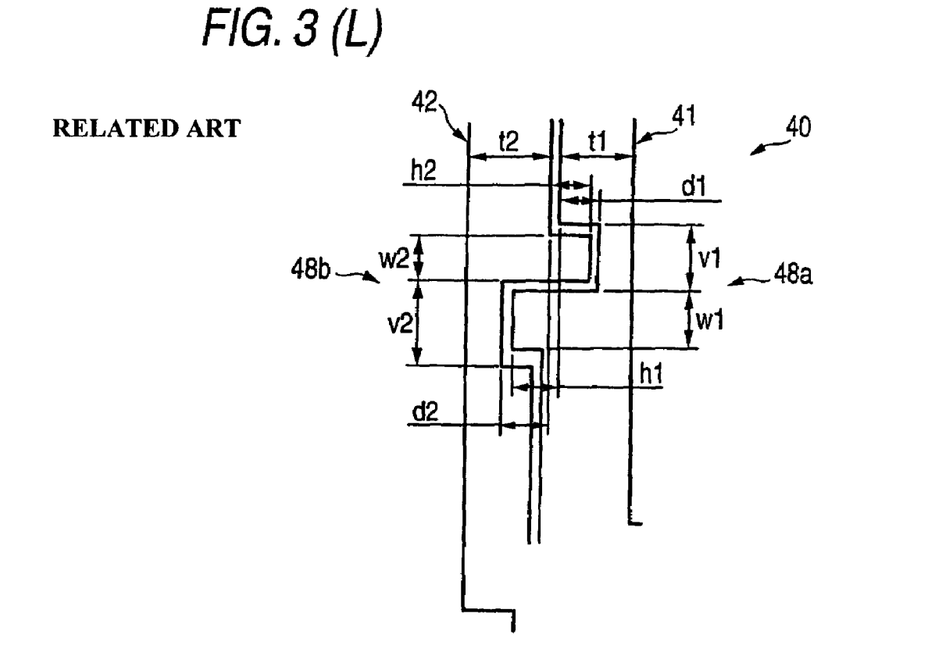
FIGS. 3(L) and 3(R) are enlarged sectional views of locking portions of a case for disk cartridges in a conventional example.

FIGS. 3(L) and (R) are enlarged sectional views showing a pair of the locking portions which are provided in the substantially middle areas of both the side faces of the case in a specific example of a conventional case for disk cartridges. FIG. 3(L) shows a left side of the case, and FIG. 3(R) shows a right side of the case.

The conventional case 40 for disk cartridges has been also integrally molded by injection molding, employing resin of PP (polypropylene) as material.

The specific values of sizes of the locking portions 48a, 48b of the case 40 are as follows.

Left Side of the Case

The locking portion 48a of the containing part 41 has a standard thickness t1=0.69, a width of the depression v1=1.00, a depth of the depression d1=0.42, a width of the projection w1=0.59, and a height of the projection h1=0.31.

Meanwhile, the locking portion 48b of the lid part 42 has a standard thickness t2=0.76, a width of the projection w2=0.88, a height of the projection h2=0.45, a width of the depression v2=0.97, and a depth of the depression d2=0.19. The values are in millimeters (mm).

Right Side of the Case

The locking portion 48a of the containing part 41 has a standard thickness t1=0.66, a width of the depression v1=0.98, a depth of the depression d1=0.44, a width of the projection w1=0.59, and a height of the projection h1=0.31.

Meanwhile, the locking portion 48b of the lid part 42 has a standard thickness t2=0.78, a width of the projection w2=0.84, a height of the projection h2=0.41, a width of the depression v2=0.93, and a depth of the depression d2=0.61. The values are in millimeters (mm).

It is to be noted that the case 10 for disk cartridges as described above is provided with the pair of the locking portions 0.7a, 7b having similar sizes to the conventional case, in the substantially middle areas of both the side faces of the case.

Comparison Between the Instant Example and the Conventional Example

In case of the conventional example in which the locking portions 48a, 48b are provided only in the substantially middle areas of the side faces of the openings 41a, 42a, when the case 40 has been pulled by a tension gauge, the lid part 42 has been opened with a force within a range of 180 g to 300 g. After opening and closing operations of the lid part 42 have been repeated several ten times, the force may be lowered to 150 g. This is attributed to a sudden drop of the locking force resulting from abrasion of the ridgelines of the depression and projection shapes of the locking portions 48*a*, 48*b* because they are not rounded.

In contrast, in case of the instant example in which the locking portions 6*a*, 6*b* are provided in the areas near the corners of the openings 1*a*, 2*a* (The other locking portions 7*a*, 7*b* are provided in the substantially middle areas of both the side faces), when the case has been pulled by the tension gauge, the locking force has been about 440 g or more at the beginning, has decreased to 380 g after 500 times of the opening and closing operations, and the locking force of 320 g has been still maintained after about 1000 times of the opening and closing operations.

For reference, five sheets of the disks weigh about 90 g, and a standard lock holding force is set to be about 250 g from experience. Therefore, the necessary lock holding force can be ensured within a range of usual number of times of the opening and closing operations in this embodiment.

Now, a second embodiment according to the present invention will be described in further detail referring to the FIGS. 6–9. The same structure as the conventional case for disk cartridges as shown in FIG. 5 will be described in a simplified manner. Substantially similar descriptions as those of the related art and previously discussed exemplary, non-limiting embodiments are also omitted for the sake of simplicity.

Figure 6:
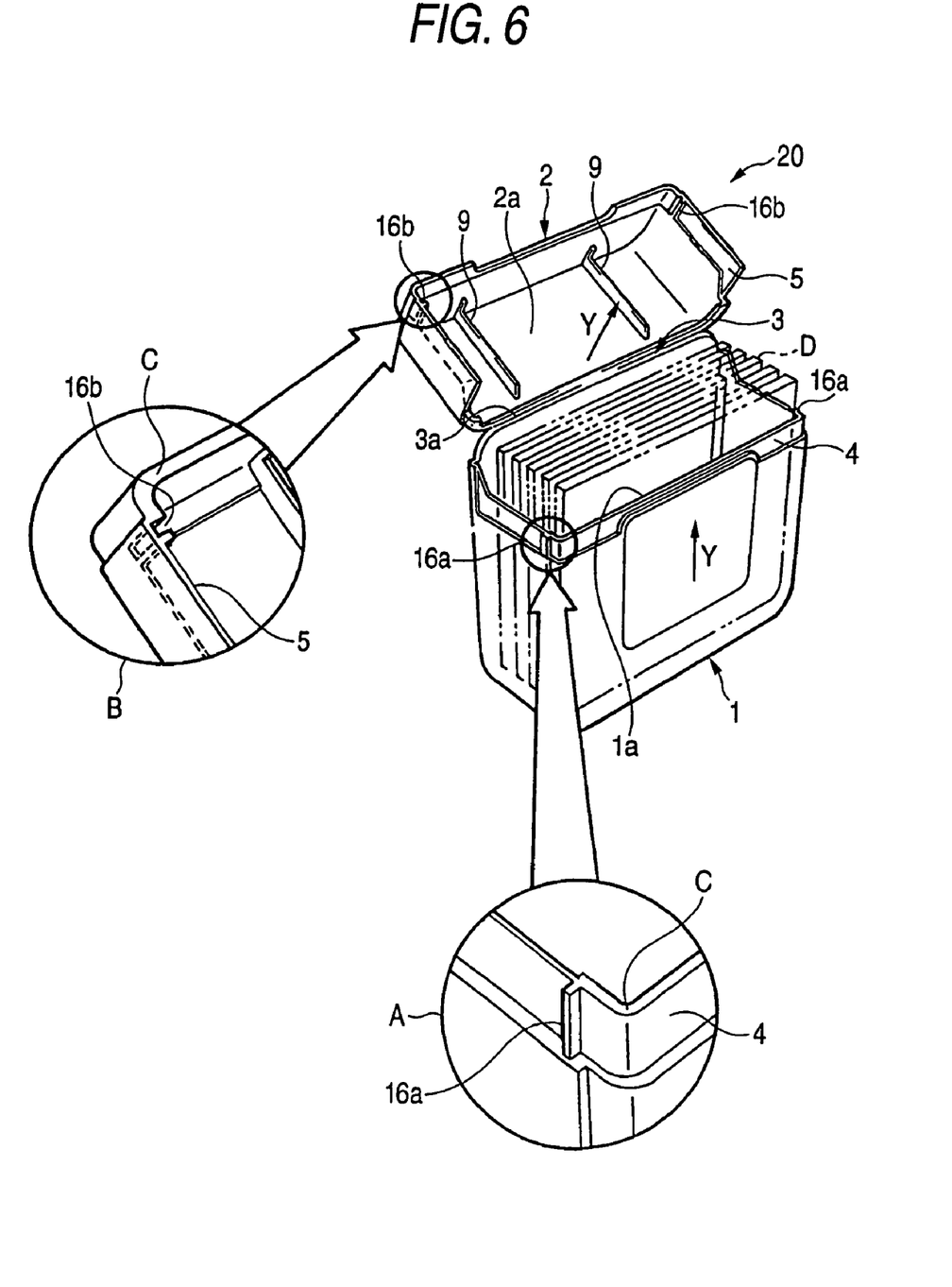
FIG. 6 is a perspective view of a case for disk cartridges in a second embodiment according to the invention in a state where a lid part is open.

In areas near both corners c at front sides of the outer stepped portion 4, there are provided locking portions (protrusion) 16*a* having a shape of projection along a direction of a vertical axis (same as a direction Y in which the molds are opened) as shown in an enlarged view A of an essential part of FIG. 6. On the other hand, in areas near both corners c at front sides of the outer stepped portion 5, there are provided locking portions (protrusion) 16*b* having a shape of projection along the direction of the vertical axis (the direction Y) as shown in an enlarged view B of an essential part of FIG. 6.

Then, operation of the case for disk cartridges in this embodiment will be described.

In this case 20 for disk cartridges, since a pair of the locking portions 16*a*, 16*b* are provided in the areas near the corners c of both the openings 1*a*, 2*a* of the containing part 1 and the lid part 2, the locking portions 16*a*, 16*b* are located in the areas which are hard to be deformed. In short, they are provided at such places as being hardly flexible and strong in strength. Accordingly, the lock is not likely to be disengaged, and sufficient lock holding force of the lid part 2 as required for practical use can be obtained.

In addition to this, the other function and effect of the present embodiment are the same as the above described embodiment.

Figure 7:
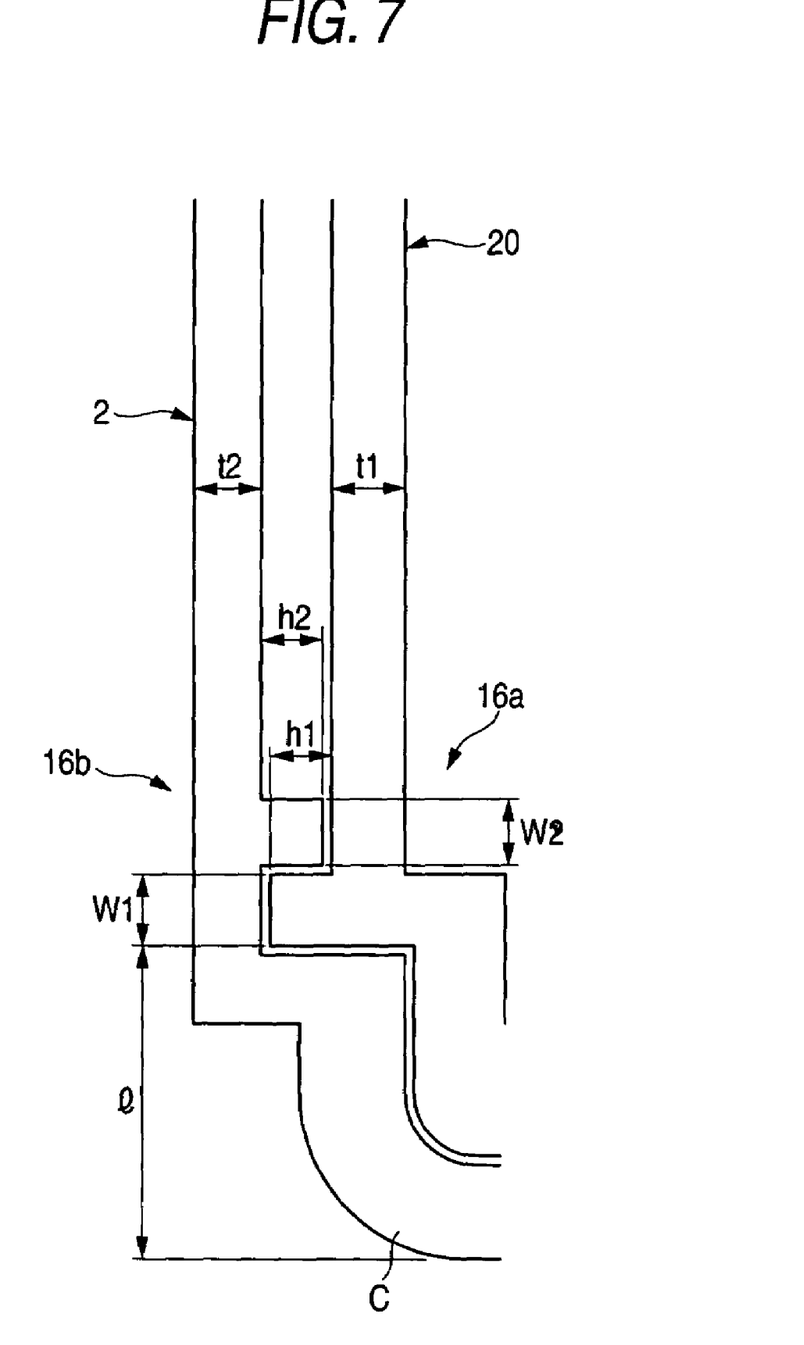
FIG. 7 is an enlarged sectional view of locking portions of the case for disk cartridges in the second embodiment.

FIG. 7 is an enlarged sectional view showing a pair of the locking portions which are provided in the areas near the corners of the case. The case 20 for disk cartridges has been integrally molded by injection molding, employing resin of PP (polypropylene) as material.

Specific values of sizes of the locking portions 16*a*, 16*b* of the containing part 1 are as follows.

The positions where the locking portions 16*a*, 16*b* of the containing part 1 are provided are the areas near the corners c, and at l=3 mm apart from a front face of the case toward a back face of the case.

The locking portion 16*a* of the containing part 1 has a standard thickness t1=1, a width of the projection w1=1, and a height of the projection h1=1. Meanwhile, the locking portion 16*b* of the lid part 2 has a standard thickness t2=1, a width of the projection w2=1, a height of the projection h2=1. The values are in millimeters (mm).

The ridgelines of the depression and the projection of the locking portions 16*a*, 16*b* are rounded at a radius of about 0.1 mm to 0.2 mm.

Figure 8:
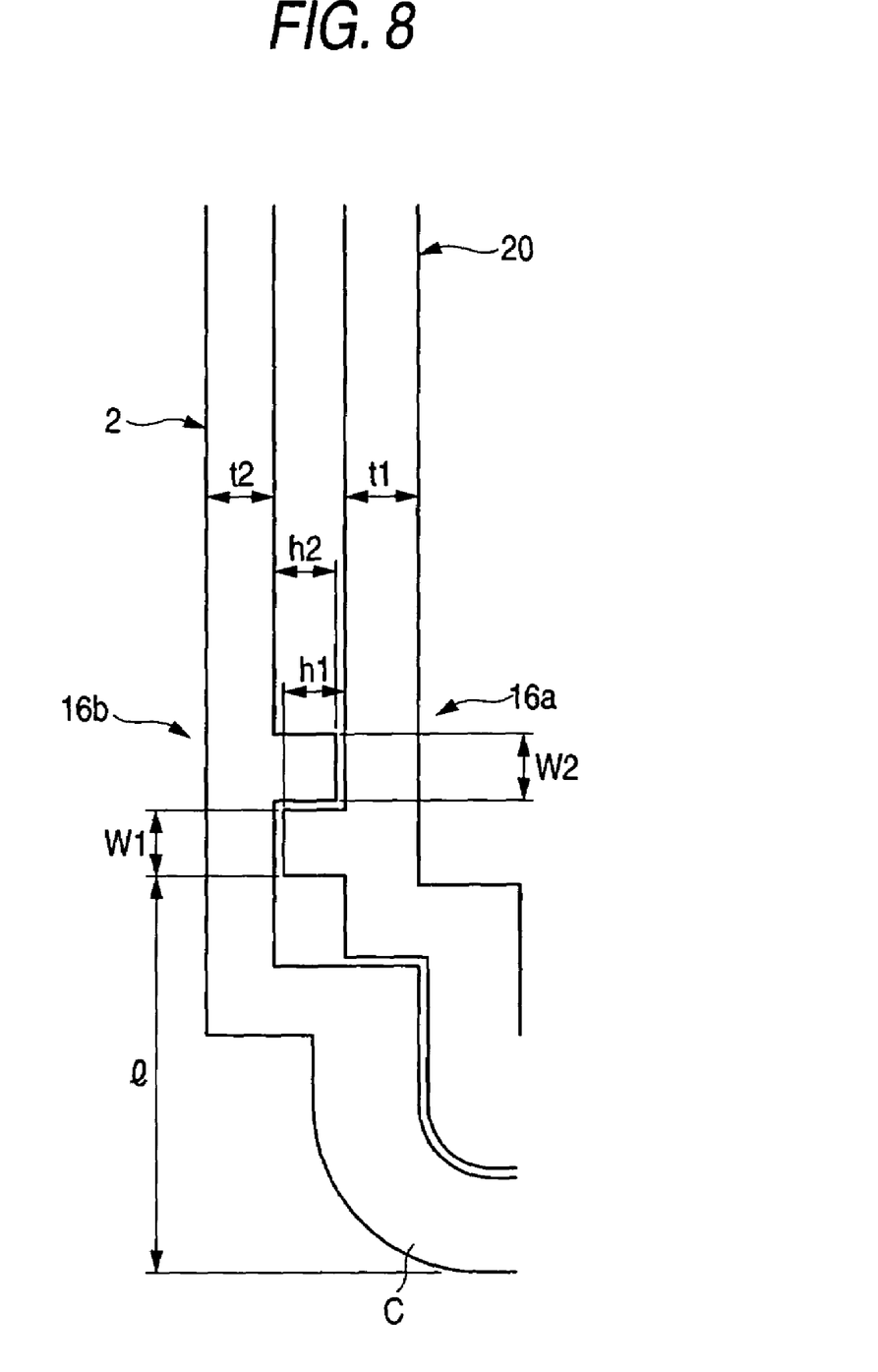
FIG. 8 is an enlarged sectional view of locking portions of the case for disk cartridges in a third embodiment.

FIG. 8 shows a variation of the locking portions shown in FIG. 7. The locking portions 16*a*, 16*b* in FIG. 8 are disposed on a more backward position in the case than that of the locking portions in FIG. 7.

Specific values of sizes of the locking portions 16*a*, 16*b* of the containing part 1 are as follows;

The positions where the locking portions 6*a*, 6*b* of the containing part 1 are provided are the areas near the corners c, and at l=5 mm apart from a front face of the case toward a back face of the case.

The locking portion 16*a* of the containing part 1 has a standard thickness t1=1, a width of the projection w1=1, and a height of the projection h1=1. Meanwhile, the locking portion 16*b* of the lid part 2 has a standard thickness t2=1, a width of the projection w2=1, a height of the projection h2=1. The values are in millimeters (mm).

Figure 9:
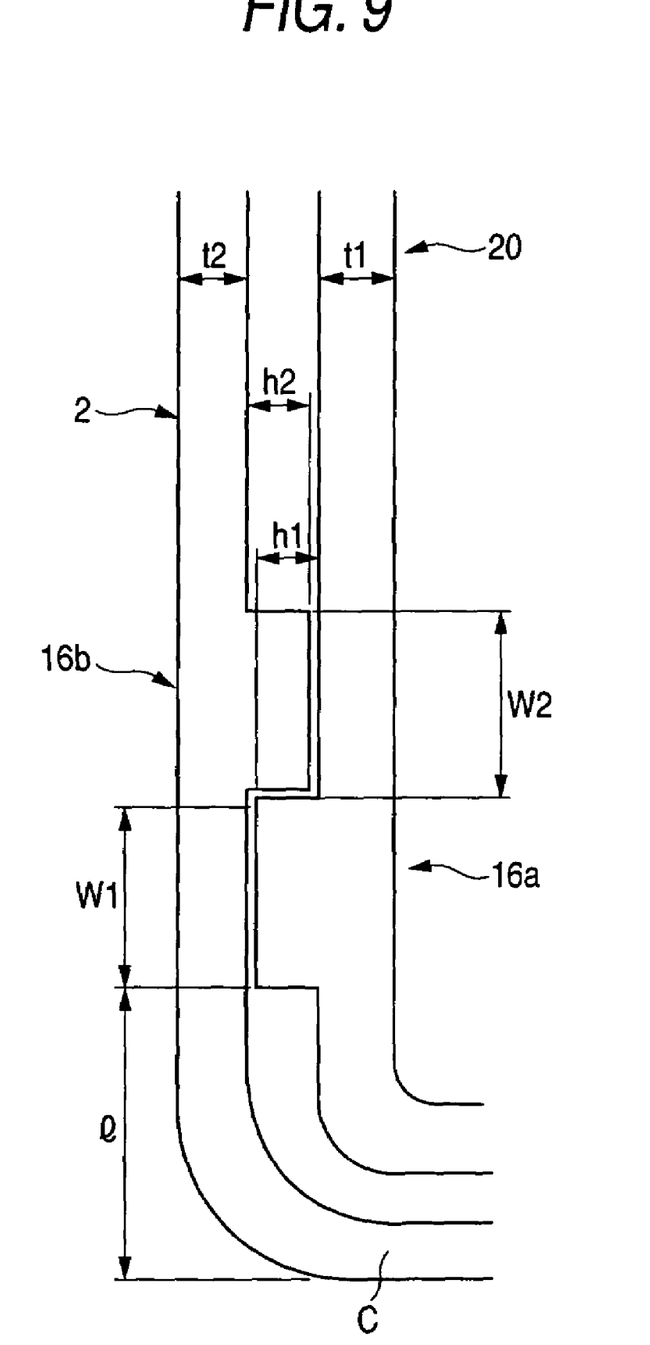
FIG. 9 is an enlarged sectional view of locking portions of the case for disk cartridges in a fourth embodiment.

FIG. 9 shows a variation of the locking portions shown in FIG. 8. The width of locking portions 16*a*, 16*b* in FIG. 9 are wider that that of the locking portions in FIG. 7.

Specific values of sizes of the locking portions 16*a*, 16*b* of the containing part 1 are as follows;

The positions where the locking portions 6*a*, 6*b* of the containing part 1 are provided are the areas near the corners c, and at l=3 mm apart from a front face of the case toward a back face of the case.

The locking portion 16*a* of the containing part 1 has a standard thickness t1=1, a width of the projection w1=4, and a height of the projection h1=1. Meanwhile, the locking portion 16*b* of the lid part 2 has a standard thickness t2=1, a width of the projection w2=4, a height of the projection h2=1. The values are in millimeters (mm).

Figure 10:
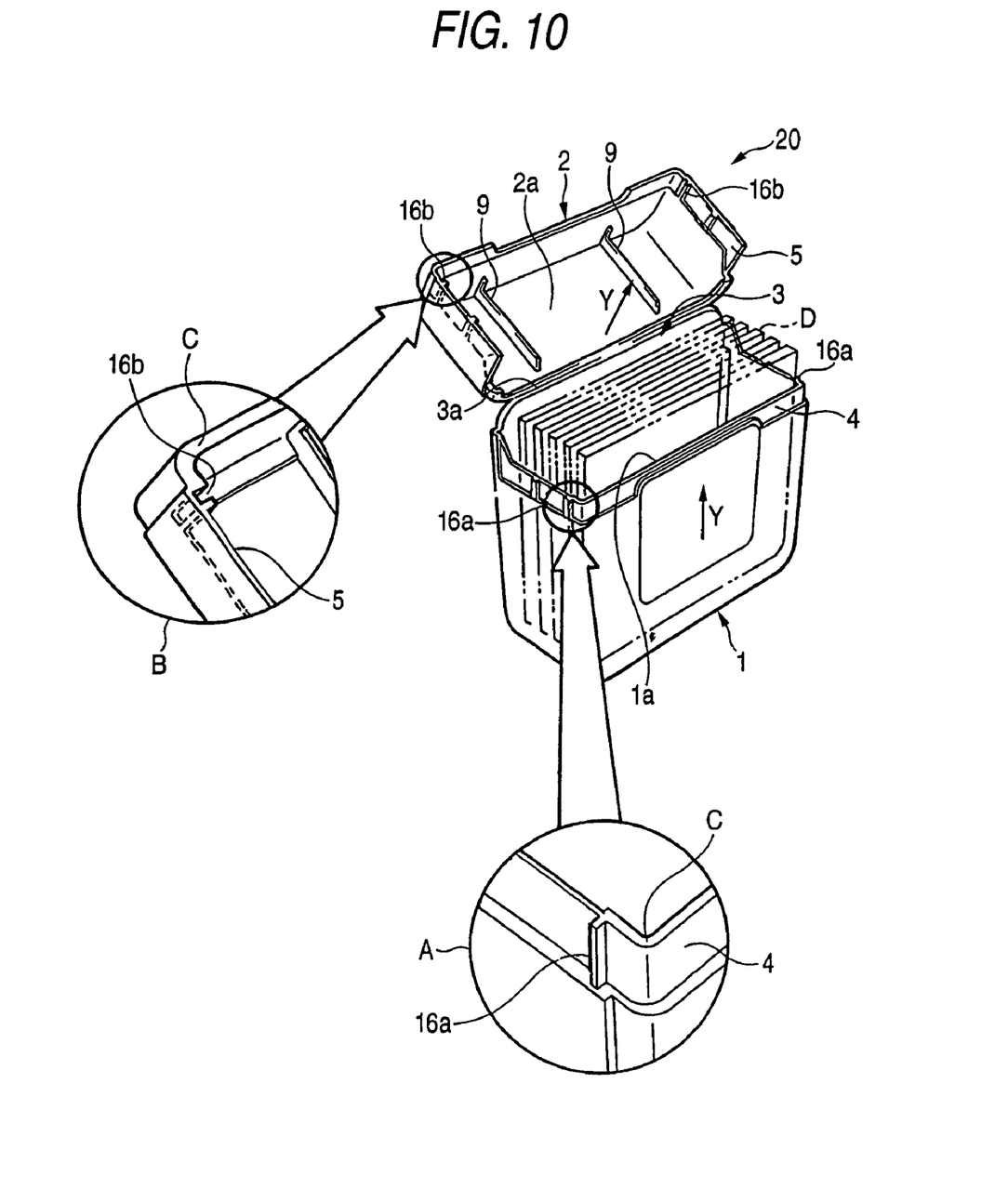
FIG. 10 is similar to FIG. 6 but shows a variation of the second embodiment.

FIG. 10 shows a variation of the second embodiment, that further includes locking portions provided in substantially middle areas of both the side faces of the openings of the containing part and the lid part, or in areas near corners at a back side. The locking portions can be employed each type of the above mentioned locking portions.

With respect to the curvature of the corners, it is noted that in the embodiments illustrated in FIGS. 7 and 8, there is a curved corner c, followed by a right-angle corner on the side. However, in FIG. 9, there is no right-angle corner on the side, and the curve between the front and side of the lid part does not have any sharp portions. In the present invention, either of the foregoing configurations may be used to shape the corner c of the lid part.

Further, it is noted that the overlapping surfaces of the lid part and the containing part have edges that are relatively parallel to each other, and that the slope of these edges is substantially zero. However, as would be understood by one skilled in the art, a completely sloped edge, sloping from an upper level in the rear corner to a lower level in the front corner, may be used for either or both of the lid part and/or the container part on the sides.

Also, FIG. 6 illustrates that the thin part of the stepped portion of the container part having a steep slope, followed by a substantially constant height. However, the height and slope of the thin part may be varied. For example, but not by way of limitation, the thin part may continuously slope from a contact point with the thick part at the rear, to having a maximum step height near the projections 16a, 16b at the corner c.

The foregoing dimensions are provided for the embodiments having locking parts, each of which includes a projection on the side and near a front corner of each of the lid portion and the container portion. Further, the size, relative dimensions and spacing of the projections with respect to the lid portion and the container portion of the case are provided as examples of possible configurations. However, this exemplary, non-limiting embodiment is not limited to the foregoing, and the present invention may be modified, as would be understood by one skilled in the art.

For example, but not by way of limitation, the present invention may be modified to store objects other than disk cartridges, and the spacing, dimensions and sizes may be further modified, as would be understood by one skilled in the art. Therefore, it is believed that various other dimensions and sizes not discussed above are also included in the scope of the present invention.

Also, as an example but not by way of limitation, the hinge between the lid part and the container part is shown to be substantially at a junction of the upper rear edge of the container part and the upper rear edge of the lid part, and continuously extending across this surface. However, as would be known to those skilled in the art, this hinge may be segmented, or have portions in areas other than the upper rear edges of the lid part and container part. Such equivalents, as well as other equivalents not disclosed herein, are believed to be within the scope of this invention.

INDUSTRIAL APPLICABILITY

As described in detail herein above, according to the invention, there are provided at least one pair of the locking portions for locking the lid part in the areas near the corners of both the side faces of the openings of both the containing part and the lid part. Accordingly, the locking portions are provided in the places which have high strength and are hardly flexible, and for this reason, the necessary lock holding force required for practical use can be sufficiently obtained.

Further, because the sufficient locking force can be obtained, the lock mechanism need not be made in an undercut shape. Therefore, the production without employing sliding cores has become possible and the manufacturing process can be simplified.

What is claimed is:

1. A case comprising:
   a containing part operative to contain objects, said containing part comprising a front face, a rear face, at least two side faces and a bottom face which opposes an opening portion, and
   a lid part provided on said opening portion of said containing part via a hinge part, said lid part operable to open and close said opening portion,
   wherein a pair of engagable, interlocking portions are positioned closer to corners of said opening portion of the lid part and the containing part than to middle portions of said opening portion of said lid part and said containing part, and wherein said pair of interlocking portions includes a lid part projection engagable with a respective container part projection, and
   wherein said lid part projection is formed on an inner surface of said lid part, such that said lid part projection projects towards an inside of said lid part,
   wherein said lid part projection does not have an undercut,
   the case further comprising locking portions provided in substantially middle portions of each of the side faces of the containing part and the lid part, or adjacent to corners at said rear face of said containing part.

2. The case as set forth in claim 1, wherein a distance of each of said interlocking portions from said front face of said case is less than or equal to one-fourth of a width of each side face in a horizontal direction.

3. The case as set forth in claim 1, wherein said projections have a rectangular shape in a cross section along a vertical axis thereof.

4. A case for storing at least one object, said case comprising:
   a containing part operative to store said at least one object, said containing part comprising a front face, a rear face, at least two side faces and a bottom face which opposes an opening portion;
   a lid part that is connected to said opening portion of said containing part via a hinge provided at an upper portion of the rear face; and
   locking portions, each comprising a first projection on said containing part and a second projection on said lid part, said first projection being engaged with said second projection when said lid part is in a closed position,
   wherein said locking portions are positioned closer to upper front corners of said containing part and lower front corners of said lid part than to middle portions of said containing part and said lid part, and
   wherein said container part is stepped on upper sides of said front face and said side faces to form thin side parts, and said first projection of said locking portions is provided at a front corner portion of said thin side pads.

5. The case as set forth in claim 4, wherein said projections have a rectangular shape in a cross section along a vertical axis thereof.

6. The ease of claim 4, wherein upper edges of said thin side parts slope downward from said rear face of said case.

7. The case of claim 4, wherein a height of said thin parts is one of constant and variable.

8. The case of claim 4, wherein said hinge comprises a first hinge part and a second hinge part, said first hinge part spaced along an upper edge of said rear face of said containing part and an upper rear edge of said lid part, and said second hinge part is not spaced along at least one of said upper edge of said rear face of said containing part and said upper rear edge of said lid part.

9. The case of claim 4, wherein a width and a height of said first projection is at least substantially equal to a width and a height of said second projection.

10. The case of claim 4, wherein widths of at least one of said first projection and said second projection are at least substantially greater than heights of at least one of said first projection and said second projection, respectively.

11. A case for storing at least one object, said case comprising:
    a containing part operative to store said at least one object, said containing part comprising a front face, a rear face, at least two side faces and a bottom face which opposes an opening portion;
    a lid part that is connected to said opening portion of said containing part via a hinge provided at an upper portion of said rear face of the case; and
    means for producing a locking force closer to upper front corners of said containing part and lower front corners of said lid part, than to middle portions of said containing part and said lid part, when said case is closed, wherein said means for producing comprises locking portions, each comprising a first projection on said containing part and a second projection on said lid part, said first projection being engaged with said second projection when said lid part is in a closed position, said locking portions being positioned closer to said upper front corners of said containing part and said lower front corners of said lid part than to said middle portions of said containing part and said lid part, and wherein said second projection is formed on an inner surface of said lid part, such that said second projection projects towards an inside of said lid part.

12. The ease as set forth in claim 11, wherein said projections have a rectangular shape in a cross section along a vertical axis thereof.

13. The case of claim 11, wherein a width and a height of said first projection is at least substantially equal to a width and a height of said second projection.

14. The case of claim 11, wherein widths of at least one of said first projection and said second projection are at least substantially greater than heights of at least one of said first projection and said second projection, respectively.

15. The case of claim 11, wherein said container part is stepped on upper sides of said front face and said side faces to form thin side parts, and said first projection of said locking portions is provided at a front corner potion of said thin side parts.

16. The case of claim 15, wherein upper edges of said thin side parts slope downward from said rear face of said case.

17. The case of claim 15, wherein a height of said thin parts is one of constant and variable.

18. The case of claim 11, wherein said hinge comprises a first hinge part and a second hinge part, said first hinge part spaced along an upper edge of said rear face of said containing part and an upper rear edge of said lid part, and a second hinge pan is not spaced along at least one of said upper edge of said rear face of said containing part and said upper rear edge of said lid part.

19. The case of claim 1, wherein widths of at least one of said lid part projection and said container part projection are at least substantially greater than heights of at least one of said lid part projection and said container part projection, respectively.

* * * * *